(12) United States Patent
Salcepuedes et al.

(10) Patent No.: US 12,447,723 B2
(45) Date of Patent: Oct. 21, 2025

(54) LINERLESS, CONFORMABLE COMPOSITE TANK STRUCTURE FOR AIRCRAFT WATER AND WASTE

(71) Applicant: MAG Aerospace Industries, LLC, Carson, CA (US)

(72) Inventors: Edita Salcepuedes, Ontario, CA (US); Mario Nakhla, La Mirada, CA (US); David Spain, Los Angeles, CA (US); Sabarrish Mohan, La Crescenta, CA (US); Misri Lal, Valencia, CA (US)

(73) Assignee: MAG Aerospace Industries, LLC, Carson, CA (US)

( * ) Notice: Subject to any disclaimer, the term of this patent is extended or adjusted under 35 U.S.C. 154(b) by 585 days.

(21) Appl. No.: 17/598,113

(22) PCT Filed: Mar. 27, 2020

(86) PCT No.: PCT/US2020/025122
§ 371 (c)(1),
(2) Date: Sep. 24, 2021

(87) PCT Pub. No.: WO2020/198554
PCT Pub. Date: Oct. 1, 2020

(65) Prior Publication Data
US 2022/0185480 A1 Jun. 16, 2022

Related U.S. Application Data

(60) Provisional application No. 62/824,873, filed on Mar. 27, 2019.

(51) Int. Cl.
*B32B 27/08* (2006.01)
*B29C 41/00* (2006.01)
(Continued)

(52) U.S. Cl.
CPC ............ *B32B 27/08* (2013.01); *B29C 41/003* (2013.01); *B29C 41/32* (2013.01);
(Continued)

(58) Field of Classification Search
CPC ..... B32B 27/08; B32B 1/00; B32B 2260/021; B32B 2260/046; B32B 27/38;
(Continued)

(56) References Cited

U.S. PATENT DOCUMENTS 5,329,777 A * 7/1994 Weltmer, Jr. ............. F17C 9/02
62/50.2
2009/0020536 A1 1/2009 DeLay
2011/0250371 A1 10/2011 Spence et al.

FOREIGN PATENT DOCUMENTS

CN 202200835 U * 4/2012
CN 104787998 A 7/2015
(Continued)

OTHER PUBLICATIONS

W.N. Shaw, "The 4 Steps of Rotational Molding", Jun. 6, 2016, https://wnshaw.com/rotational-molding-steps/. (Year: 2016).*
(Continued)

*Primary Examiner* — Christopher W Raimund
(74) *Attorney, Agent, or Firm* — Kilpatrick Townsend & Stockton LLP

(57) ABSTRACT

A linerless composite tank for a waste or water system on board an aerospace vehicle includes a monolithic tank body having a first composite material co-cured with a second composite material. The first composite material includes a first resin and the second composite material includes a second resin that is different from the first resin. The first composite material forms an innermost surface of the monolithic tank body defining a tank chamber of the monolithic tank body. A method of manufacturing the linerless com-
(Continued)

posite tank includes providing a mold having a desired interior shape of the monolithic tank, applying the first composite material to the mold, applying the second composite material to the mold, and co-curing the first composite material with the second composite material to form the monolithic composite tank.

8 Claims, 2 Drawing Sheets

(51) Int. Cl.
    *B29C 41/32*      (2006.01)
    *B29C 70/00*      (2006.01)
    *B29C 70/30*      (2006.01)
    *B29K 63/00*      (2006.01)
    *B29K 75/00*      (2006.01)
    *B29L 31/00*      (2006.01)
    *B64D 11/02*      (2006.01)

(52) U.S. Cl.
    CPC .......... *B29C 70/0035* (2021.05); *B29C 70/30* (2013.01); *B64D 11/02* (2013.01); *B29K 2063/00* (2013.01); *B29K 2075/00* (2013.01); *B29L 2031/7154* (2013.01); *B29L 2031/7172* (2013.01)

(58) Field of Classification Search
    CPC ............ B32B 27/40; B32B 2262/0269; B32B 2262/101; B32B 5/02; B32B 5/024; B32B 27/12; B32B 2262/106; B29C 41/003; B29C 41/32; B29C 70/0035; B29C 70/30; B64D 11/02; B29K 2063/00; B29K 2075/00; B29L 2031/7154; B29L 2031/7172; Y02T 50/40; B29D 22/003
See application file for complete search history.

(56) References Cited

FOREIGN PATENT DOCUMENTS

| | | |
|---|---|---|
| CN | 106429060 A | 2/2017 |
| CN | 108058406 A | 5/2018 |
| CN | 108995239 A | 12/2018 |
| EP | 0696498 A2 | 2/1996 |
| EP | 1134069 A1 * | 9/2001 ........... B29C 70/443 |

OTHER PUBLICATIONS

Kumar et al., "Effect of Post-Curing on Thermal and Mechanical Behavior of GFRP Composites", 2015 IOP Conf. Series: Materials Science and Engineering 75 012012 (2015). (Year: 2015).*
China Patent Application No. 202080024554.9, Office Action, Oct. 13, 2023.
China Appl. No. 202080024554.9, Office Action, Jan. 18, 2024.
International Patent Application No. PCT/US2020/025122, International Search Report and Written Opinion, dated Jul. 9, 2020.
Europe Patent Application No. 20723234.9, Office Action (Communication pursuant to Article 94(3) EPC), dated Feb. 16, 2023.
China Patent Application No. 202080024554.9, Office Action, dated Jun. 1, 2023.
Canadian Application No. 3,134,611, Office Action mailed on May 22, 2025, 5 pages.

* cited by examiner

LINERLESS, CONFORMABLE COMPOSITE TANK STRUCTURE FOR AIRCRAFT WATER AND WASTE

REFERENCE TO RELATED APPLICATION

The application claims the benefit of U.S. Provisional Application No. 62/824,873, filed on Mar. 27, 2019 and entitled LINERLESS, CONFORMABLE COMPOSITE TANK STRUCTURE FOR AIRCRAFT WATER AND WASTE, the content of which is hereby incorporated by reference in its entirety.

FIELD OF THE INVENTION

This application relates to composite tank structures for aerospace water and waste applications.

BACKGROUND

Waste systems and water systems (or other liquid delivery systems) for an aircraft commonly include one or more tanks to hold a volume of liquid (e.g., water and/or waste). In some cases, various metals such as titanium, corrosion resistant steel, and other metals have been used to form such tanks because the metals may meet aerospace regulatory requirements, such as those for flammability, smoke and toxicity compliance, potability and/or FDA compliance, pressure requirements, temperature requirements, chemical resistance requirements, structural and/or impact requirements, and/or other requirements. While metal tanks meet such aerospace requirements, they are typically heavy and add substantial weight to the aircraft, and it is difficult to form the metal into complex geometries that may be required on the aircraft.

An alternative to metal tanks are tanks formed from composite materials such as thermoplastic or thermoset materials. Traditionally, such composite tanks have required a liner on an interior surface of the tanks so that the composite tanks can comply with various chemical and sealing requirements. Such liners have traditionally been seam-welded metal liners or pre-molded thermoplastic liners. The formation of composite tanks with these liners requires a pre-fabrication step for the liner that can include placement of the liner by hand in pre-cut patterns, winding using a winding machine, or adhesive bonding. While composite tanks with liners are lightweight compared to metal tanks, the forming process of such tanks can be time consuming and thus costly due to the required pre-fabrication steps. For example, it is not uncommon for a forming process for a composite tank to require 20-30 hours of production time.

SUMMARY

The terms "invention," "the invention," "this invention" and "the present invention" used in this patent are intended to refer broadly to all of the subject matter of this patent and the patent claims below. Statements containing these terms should be understood not to limit the subject matter described herein or to limit the meaning or scope of the patent claims below. Embodiments of the invention covered by this patent are defined by the claims below, not this summary. This summary is a high-level overview of various aspects of the invention and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings and each claim.

According to certain embodiments of the disclosure, a method of manufacturing a monolithic composite tank body for a waste or water system on board an aerospace vehicle includes providing a mold having a desired interior shape of the monolithic composite tank body and applying a first curable composite material to the mold, where the first curable composite material comprises a first resin. The method includes applying a second curable composite material to the mold having the first curable composite material, where the second curable composite material includes a second resin that is different from the first resin. The method also includes co-curing the first curable composite material with the second curable composite material to form the monolithic composite tank body.

In some embodiments, the first resin includes a thermoset material, and applying the first curable composite material includes applying the thermoset material to the mold. The thermoset material may include polyurethane, and applying the thermoset material may include applying the polyurethane to the mold. In various examples, the second resin includes a thermoplastic material, and applying the second curable composite material com includes applying the thermoplastic material to the mold. In some cases, the thermoplastic material includes epoxy, and applying the thermoplastic material includes applying the epoxy to the mold.

In various embodiments, the second curable composite material further includes at least one reinforcement fiber incorporated in the second resin, and applying the second curable composite material includes applying the second resin comprising the at least one reinforcement fiber to the mold. In certain aspects, the method includes removing the mold after curing. In some cases, applying the first curable composite material to the mold includes applying the first curable composite material such that the first curable composite material directly contacts a surface of the mold. In some embodiments, the first resin includes polyurethane and the second resin includes epoxy.

According to certain embodiments of the disclosure, a linerless composite tank for a waste or water system on board an aerospace vehicle includes a monolithic tank body that includes a first curable composite material co-cured with a second curable composite material. The first curable composite material includes a first resin and the second curable composite material includes a second resin that is different from the first resin, and the first curable composite material forms an innermost surface of the monolithic tank body that defines a tank chamber of the monolithic tank body.

In various embodiments, the second curable composite material further includes at least one reinforcing fiber incorporated in the second resin. The at least one reinforcing fiber may include at least one of carbon fiber, fiber glass, or aramid fiber. In some cases, the at least one reinforcing fiber includes a plurality of reinforcing fibers.

In some embodiments, the first resin comprises a thermoset material, and, in various examples, the thermoset material includes polyurethane. In certain embodiments, the second resin includes a thermoplastic material, and, in some examples, the thermoplastic material includes epoxy.

According to certain embodiments of the disclosure, a linerless composite tank for a waste or water system on board an aerospace vehicle includes a monolithic tank body that includes an inner surface and an outer surface where the inner surface defines a tank chamber. The monolithic tank body includes an epoxy-based curable composite material co-cured with a polyurethane-based curable composite material, and the polyurethane-based curable composite material forms the inner surface of the tank body.

In some embodiments, the epoxy-based curable composite material further includes at least one reinforcing fiber incorporated in the epoxy-based curable composite material. The at least one reinforcing fiber may include at least one of carbon fiber, fiber glass, or aramid fiber.

Various implementations described herein can include additional systems, methods, features, and advantages, which cannot necessarily be expressly disclosed herein but will be apparent to one of ordinary skill in the art upon examination of the following detailed description and accompanying drawings. It is intended that all such systems, methods, features, and advantages be included within the present disclosure and protected by the accompanying claims.

DETAILED DESCRIPTION

Figure 1:
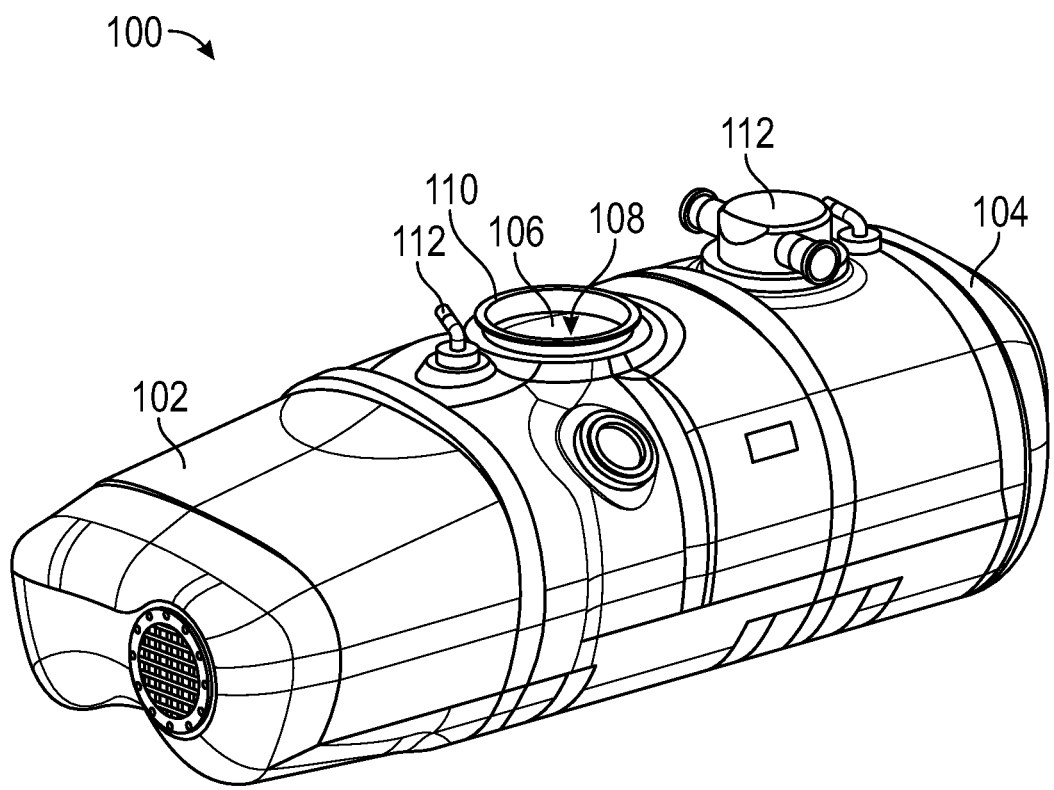
FIG. 1 illustrates an example of a composite tank structure according to embodiments of the disclosure.

The subject matter of embodiments of the present invention is described here with specificity to meet statutory requirements, but this description is not necessarily intended to limit the scope of the claims. The claimed subject matter may be embodied in other ways, may include different elements or steps, and may be used in conjunction with other existing or future technologies. This description should not be interpreted as implying any particular order or arrangement among or between various steps or elements except when the order of individual steps or arrangement of elements is explicitly described.

Described herein is a composite tank structures for water and/or waste systems on board of an aerospace vehicle such as (but not limited to) an aircraft. The composite tank structure includes a first curable composite material that is co-cured with a second curable composite material to form a monolithic tank body of the composite tank structure. The first curable composite material includes a first resin, and the second curable composite material includes a second resin that is different from the first resin. In some non-limiting examples, the first resin includes a thermoset and the second resin includes a thermoplastic, and in one non-limiting example, the first resin includes polyurethane and the second resin includes epoxy. Optionally, one or more reinforcing fibers may be incorporated with the second resin to form the second composite material. In various aspects, the first curable composite material may form an innermost surface of the tank body that defines a tank chamber of the tank body after the first curable composite material is co-cured with the second curable composite material.

In certain aspects, the first curable composite material allows the resulting composite tank body to comply with the various chemical, sealing, and/or other aircraft requirements or standards for waste and water applications without needing a separate liner as the innermost surface. As some non-limiting examples, the tank body having the first curable composite material that is co-cured with the second curable composite material may be compliant with aircraft flammability, smoke, and toxicity emission standards, may be chemical resistant (e.g., withstands waste, cleaning, and disinfection solutions used in aircraft water and waste applications), may be FDA standards/meet potability standards, may be compliant with aircraft pressure standards (e.g., withstands positive and negative pressure cycles), etc.

The omission of a separate liner reduces the production time needed to form the composite tank (and associated costs) because the liner pre-fabrication step is not required compared to existing composite tanks. In some cases, the production time may be reduced by about 50% compared to the production time needed for existing tanks with liners. The omission of the separate liner may also reduce the overall weight of the composite tank compared to existing tanks with liners. The composite tank structure without the liner may also be more flexible compared to composite tanks with liners and may better withstand forces that may occur during use. The composite tank may also be formable into a variety of shapes that are otherwise not obtainable with existing composite tanks having the liner.

Figure 2:
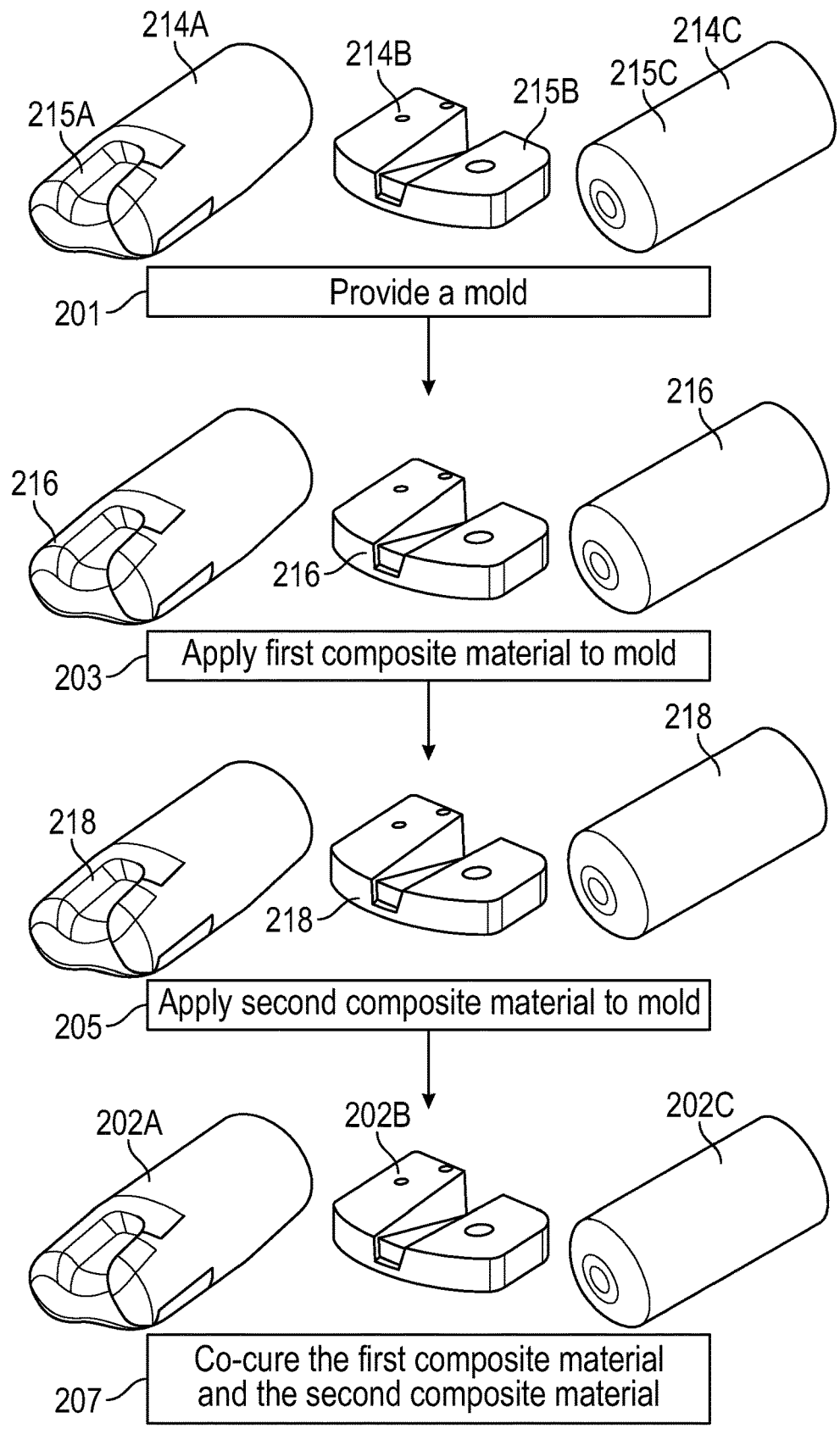
FIG. 2 illustrates a forming process for forming a composite tank structure according to embodiments of the disclosure.

FIG. 1 illustrates an example of a composite tank structure (100) for waste and/or water applications on board an aerospace vehicle such as an aircraft according to embodiments. The composite tank structure (100) includes an integral or monolithic tank body (102) that has an outer surface (104) and an inner surface (106). The inner surface (106) may define one or more tank chambers (108) that can store an amount of liquid and/or other solution of the waste and/or water applications. One or more openings (110) may provide access to the tank chamber(s) (108), and fittings (112) (or other suitable couplings or other components) may be connected to the openings (110) such that the composite tank structure (100) is in fluid communication with other components (e.g., piping, tubing, sinks, toilets, faucets, etc.) of the waste and/or water applications. The particular shape of the tank body (102) illustrated in FIG. 1 should not be considered limiting on the current disclosure, as the tank body (102) may have various other suitable shapes as desired. For example, FIG. 2 illustrates non-limiting examples of tank bodies (202A-C) having different shapes compared to the tank body (102). Optionally, various water and/or waste sensors may be included with the composite tank structure (100).

The monolithic tank body (102) includes a first curable composite material that is co-cured with a second curable composite material to form the monolithic tank body (102). In various aspects, the first curable composite material at least partially forms the inner surface (106) of the monolithic tank body (102).

In various embodiments, the first curable composite material includes a first resin and the second curable composite material includes a second resin that is different from the first resin. In some embodiments, the first resin may include a thermoset material. In one embodiment, the first resin includes polyurethane. Optionally, additives may be incorporated as part of the first curable composite material to improve the performance of the composite tank and/or to meet various aircraft requirements and/or standards. As one example, an additive may be included to improve compliance of the composite tank with flammability, smoke, and toxicity emission standards.

In some embodiments, the second curable composite material may include a thermoplastic material or a thermoset material. Such thermoplastic materials suitable for the second curable composite material may include, but are not limited to, polyethylenimine, polyphenylene sulfide, polyphenylsulfone, polyether ether ketone, polyetherketone ketone, polyvinylidene fluoride, or any other appropriate thermoplastic material or combination of materials, and such thermoset materials suitable for the second curable composite material may include, but are not limited to epoxy, vinyl ester, or any other appropriate thermoset material or combination of materials. The second curable composite material may optionally include reinforcing fibers, such as carbon fibers, fiber glass, aramid fibers (e.g., Kevlar®, Nomex®, etc.), any other suitable reinforcing fibers, or combinations thereof. The fibers may be continuous or short fibers and may be uni-directional, multi-directional, woven, braided or a combination of these. Depending on the process selected, the fibers could be dry with resin (thermoplastic or thermoset) being introduced at the time of part lay up or pre-impregnated fiber(s) could be used.

FIG. 2 illustrates an example of a manufacturing process for manufacturing tank bodies according to embodiments of the disclosure. The process of FIG. 2 is illustrated as forming the distinct tank bodies (202A-C), although it will be appreciated that any of the tank bodies discussed herein may be formed by the process illustrated in FIG. 2.

In a block (201), the process includes providing a mandrel or mold that defines a desired interior shape of the monolithic composite tank body. In the example of FIG. 2, three exemplary molds (214A-C) are illustrated, each of which has a mold surface (215A-C) that defines a different interior shape for a tank body. The mold(s) may be formed from various suitable materials such as metal, plastic, or silicone. In some cases, the mold(s) may be inflatable and deflatable, although they need not be in other examples.

In a block (203), the process includes applying the first curable composite material (216) on of the molds (214A-C). In a block (205), the process includes applying the second curable composite material (218) onto the molds (214A-C) that already have the first curable composite material (216). In various aspects, the second curable composite material (218) and the first curable composite material (216) are applied onto the molds (214A-C) such that the first curable composite material contacts the mold surfaces (215A-C) and/or will form the inner surfaces of the tank bodies (202A-C). In a block (207), the process includes co-curing in an oven or other suitable device the first curable composite material (216) with the second curable composite material (218) to form the tank bodies (202A-C). In various examples, after the co-curing stage, the molds (214A-C) may be respectively removed from the formed tank bodies (202A-C). Depending on the type of mold, the molds may be removed by various suitable processes such as pulling the tank bodies (202A-C) off of the molds (214A-C), deflating the molds (214A-C), dissolving the molds (214A-C), deforming the molds (214A-C), etc. In some optional cases, a second curing process is performed on the tank bodies (202A-C) after the molds (214A-C) are removed.

Other processes for making composite could include resin transfer molding (RTM) and/or vacuum assisted resin transfer molding (VARTM). These are variations of wetting out reinforcing fiber with resin (thermoplastic or thermoset).

A collection of exemplary embodiments, including at least some explicitly enumerated as "Examples," providing additional description of a variety of embodiment types in accordance with the concepts described herein are provided below. These examples are not meant to be mutually exclusive, exhaustive, or restrictive; and the invention is not limited to these example embodiments but rather encompasses all possible modifications and variations within the scope of the issued claims and their equivalents.

Example 1

A method of manufacturing a monolithic composite tank body for a waste or water system on board an aerospace vehicle, the method comprising: providing a mold comprising a desired interior shape of the monolithic composite tank body; applying a first curable composite material to the mold, wherein the first curable composite material comprises a first resin, applying a second curable composite material to the mold comprising the first curable composite material, wherein the second curable composite material comprises a second resin that is different from the first resin; and co-curing the first curable composite material with the second curable composite material to form the monolithic composite tank body.

Example 2

The method of any preceding or subsequent examples or combination of examples, wherein the first resin comprises a thermoset material, and wherein applying the first curable composite material comprises applying the thermoset material to the mold.

Example 3

The method of any preceding or subsequent examples or combination of examples, wherein the thermoset material comprises polyurethane, and wherein applying the thermoset material comprises applying the polyurethane to the mold.

Example 4

The method of any preceding or subsequent examples or combination of examples, wherein the second resin comprises a thermoplastic material, and wherein applying the second curable composite material comprises applying the thermoplastic material to the mold.

Example 5

The method of any preceding or subsequent examples or combination of examples, wherein the thermoplastic material comprises epoxy, and wherein applying the thermoplastic material comprises applying the epoxy to the mold.

Example 6

The method of any preceding or subsequent examples or combination of examples, wherein the second curable composite material further comprises at least one reinforcement fiber incorporated in the second resin, and wherein applying the second curable composite material comprises applying the second resin comprising the at least one reinforcement fiber to the mold.

Example 7

The method of any preceding or subsequent examples or combination of examples, further comprising removing the mold after curing.

Example 8

The method of any preceding or subsequent examples or combination of examples, wherein applying the first curable composite material to the mold comprises applying the first curable composite material such that the first curable composite material directly contacts a surface of the mold.

Example 9

The method of any preceding or subsequent examples or combination of examples, wherein the first resin comprises polyurethane and wherein the second resin comprises epoxy.

Example 10

A linerless composite tank for a waste or water system on board an aerospace vehicle, the composite tank comprising a monolithic tank body comprising a first curable composite material co-cured with a second curable composite material, wherein the first curable composite material comprises a first resin and the second curable composite material comprises a second resin that is different from the first resin, and wherein the first curable composite material forms an innermost surface of the monolithic tank body that defines a tank chamber of the monolithic tank body.

Example 11

The linerless composite tank of any preceding or subsequent examples or combination of examples, wherein the second curable composite material further comprises at least one reinforcing fiber incorporated in the second resin.

Example 12

The linerless composite tank of any preceding or subsequent examples or combination of examples, wherein the at least one reinforcing fiber comprises at least one of carbon fiber, fiber glass, or aramid fiber.

Example 13

The linerless composite tank of any preceding or subsequent examples or combination of examples, wherein the at least one reinforcing fiber comprises a plurality of reinforcing fibers.

Example 14

The linerless composite tank of any preceding or subsequent examples or combination of examples, wherein the first resin comprises a thermoset material.

Example 15

The linerless composite tank of any preceding or subsequent examples or combination of examples, wherein the thermoset material comprises polyurethane.

Example 16

The linerless composite tank of any preceding or subsequent examples or combination of examples, wherein the second resin comprises a thermoplastic material.

Example 17

The linerless composite tank of any preceding or subsequent examples or combination of examples, wherein the thermoplastic material comprises epoxy.

Example 18

A linerless composite tank for a waste or water system on board an aerospace vehicle, the composite tank comprising a monolithic tank body comprising an inner surface and an outer surface, wherein the inner surface defines a tank chamber, wherein the monolithic tank body comprises an epoxy-based curable composite material co-cured with a polyurethane-based curable composite material, and wherein the polyurethane-based curable composite material forms the inner surface of the tank body.

Example 19

The linerless composite tank of any preceding or subsequent examples or combination of examples, wherein the epoxy-based curable composite material further comprises at least one reinforcing fiber incorporated in the epoxy-based curable composite material.

Example 20

The linerless composite tank of any preceding or subsequent examples or combination of examples, wherein the at least one reinforcing fiber comprises at least one of carbon fiber, fiber glass, or aramid fiber.

Example 21

A water system on board an aerospace vehicle comprising the linerless composite tank of any preceding or subsequent examples or combination of examples.

Example 22

The water system of any preceding or subsequent examples or combination of examples, wherein the aerospace vehicle comprises an aircraft.

Example 23

A waste system on board an aerospace vehicle comprising the linerless composite tank of any preceding or subsequent examples or combination of examples.

Example 24

The waste system of any preceding or subsequent examples or combination of examples, wherein the aerospace vehicle comprises an aircraft.

Different arrangements of the components depicted in the drawings or described above, as well as components and steps not shown or described are possible. Similarly, some features and sub-combinations are useful and may be employed without reference to other features and sub-combinations. Embodiments of the invention have been described for illustrative and not restrictive purposes, and alternative embodiments will become apparent to readers of this patent. Accordingly, the present invention is not limited to the embodiments described above or depicted in the drawings, and various embodiments and modifications may be made without departing from the scope of the claims below That which is claimed is:
1. A method of manufacturing a monolithic composite tank body for a waste or water system on board an aerospace vehicle, the method comprising:

providing a mold comprising a desired interior shape of the monolithic composite tank body wherein the mold comprises at least three co-linear formations that form at least three co-linear openings on a first side of a monolithic composite tank body, and wherein the openings are configured to be in fluid communication with at least one sink, toilet, faucet, piping, or tubing, wherein the first side is a longest side of a plurality of sides of the monolithic tank body;

applying a first curable composite material to the mold, wherein the first curable composite material comprises a first resin;

applying a second curable composite material to the mold comprising the first curable composite material, wherein the second curable composite material comprises a second resin that is different from the first resin;

co-curing the first curable composite material with the second curable composite material to form the monolithic composite tank body;

removing the mold; and performing a second curing process on the monolithic tank body after the monolithic tank body is removed from the mold.

2. The method of claim 1, wherein the first resin comprises a thermoset material, and wherein applying the first curable composite material comprises applying the thermoset material to the mold.

3. The method of claim 2, wherein the thermoset material comprises polyurethane, and wherein applying the thermoset material comprises applying the polyurethane to the mold.

4. The method of claim 1, wherein the second resin comprises a thermoplastic material, and wherein applying the second curable composite material comprises applying the thermoplastic material to the mold.

5. The method of claim 4, wherein the thermoplastic material comprises epoxy, and wherein applying the thermoplastic material comprises applying the epoxy to the mold.

6. The method of claim 1, wherein the second curable composite material further comprises at least one reinforcement fiber incorporated in the second resin, and wherein applying the second curable composite material comprises applying the second resin comprising the at least one reinforcement fiber to the mold.

7. The method of claim 1, wherein applying the first curable composite material to the mold comprises applying the first curable composite material such that the first curable composite material directly contacts a surface of the mold.

8. The method of claim 1, wherein the first resin comprises polyurethane and wherein the second resin comprises epoxy.

* * * * *